United States Patent
Yamada et al.

(10) Patent No.: US 7,876,358 B2
(45) Date of Patent: Jan. 25, 2011

(54) PRINT APPARATUS AND PRINTER CONTROL METHOD

(75) Inventors: Akitoshi Yamada, Yokohama (JP); Takao Aichi, Ohta-ku (JP); Kazuyuki Masumoto, Yokohama (JP); Mitsuhiro Ono, Koto-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 449 days.

(21) Appl. No.: 11/567,253

(22) Filed: Dec. 6, 2006

(65) Prior Publication Data

US 2007/0097428 A1    May 3, 2007

Related U.S. Application Data

(63) Continuation of application No. PCT/JP2005/010424, filed on Jun. 7, 2005.

(30) Foreign Application Priority Data

Jun. 8, 2004    (JP)    ............... 2004-170225

(51) Int. Cl.
*H04N 5/225*    (2006.01)
(52) U.S. Cl. .................................. 348/207.2
(58) Field of Classification Search ............. 348/207.2, 348/207.1; 358/1.13, 1.15; 713/320
See application file for complete search history.

(56) References Cited

U.S. PATENT DOCUMENTS

| | | | | |
|---|---|---|---|---|
| 6,009,529 | A * | 12/1999 | Park ............................ | 713/320 |
| 6,163,817 | A * | 12/2000 | Shteyn et al. .................. | 710/8 |
| 6,603,937 | B2 | 8/2003 | Yoshimura et al. ............ | 399/81 |
| 6,636,974 | B1 * | 10/2003 | Hong ........................... | 726/19 |
| 6,711,626 | B1 * | 3/2004 | Okada ........................... | 710/5 |
| 7,038,714 | B1 * | 5/2006 | Parulski et al. ........... | 348/207.2 |
| 7,139,908 | B2 | 11/2006 | Hamamoto et al. ............. | 713/2 |
| 2002/0062407 | A1 * | 5/2002 | Tateyama et al. .............. | 710/11 |
| 2002/0140963 | A1 * | 10/2002 | Otsuka ........................ | 358/1.14 |
| 2003/0020951 | A1 * | 1/2003 | Minowa et al. ............. | 358/1.15 |
| 2003/0067620 | A1 * | 4/2003 | Masumoto et al. .......... | 358/1.13 |
| 2004/0013441 | A1 | 1/2004 | Yoshimura et al. ............ | 399/81 |
| 2004/0021902 | A1 | 2/2004 | Ogiwara et al. ............ | 358/1.15 |
| 2004/0032618 | A1 | 2/2004 | Yano et al. .................. | 358/1.16 |
| 2004/0056956 | A1 * | 3/2004 | Gardiner et al. .......... | 348/207.1 |
| 2004/0090652 | A1 | 5/2004 | Yoon .......................... | 358/1.16 |
| 2007/0013956 | A1 | 1/2007 | Mikami et al. .............. | 358/296 |

FOREIGN PATENT DOCUMENTS

| | | |
|---|---|---|
| CN | 1485796 | 3/2004 |
| CN | 1497422 A | 5/2004 |
| EP | 1389000 | 2/2004 |

(Continued)

*Primary Examiner*—Tuan Ho
(74) *Attorney, Agent, or Firm*—Fitzpatrick, Cella, Harper & Scinto

(57) ABSTRACT

A printing apparatus 1000 records an image on a recording medium. The printing apparatus is provided with communication means for communicating with a digital camera 3012, digital camera recognizing means for recognizing the digital camera 3012, and status display means for displaying the operation status of the printing apparatus 1000. In a status where the status display means is displaying a status wherein a power supply is turned off, the communicating means communicates with the digital camera 3012. When the digital camera is recognized by the digital camera recognizing means, a display by the status display means can be changed from the printing apparatus side.

14 Claims, 9 Drawing Sheets

FOREIGN PATENT DOCUMENTS

| | | |
|---|---|---|
| JP | 2000-190599 | 7/2000 |
| JP | 2001-337752 | 12/2001 |
| JP | 2002-31987 | 1/2002 |
| JP | 2002-178610 | 6/2002 |
| JP | 2002-237978 | 8/2002 |
| JP | 2003076650 A | 3/2003 |
| JP | 2003-251833 | 9/2003 |
| JP | 2004-9390 | 1/2004 |
| JP | 2004009390 A | 1/2004 |
| JP | 2004-114464 | 4/2004 |
| JP | 2004-120601 | 4/2004 |
| JP | 2004-127188 | 4/2004 |
| JP | 2004-129221 | 4/2004 |
| JP | 2004-130561 | 4/2004 |

* cited by examiner ially filed Jun. 7, 2005. The entire
PRINT APPARATUS AND PRINTER CONTROL METHOD

CROSS REFERENCE TO RELATED APPLICATIONS

This application is a continuation of International Application No. PCT/JP2005/010424, filed Jun. 7, 2005. The entire disclosure of this prior application is incorporated by reference herein.

TECHNICAL FIELD

The present invention relates to a print apparatus and a printer control method, particularly as pertains to suitable technology using a print apparatus that supports direct communication with a digital camera.

BACKGROUND ART

Conventionally, printing images photographed with a digital camera has required downloading images stored in the digital camera to a personal computer, and using an application on the personal computer to print the images on a connected printer. That is, image data workflow has followed the sequence of "digital camera—personal computer—printer," with the presence of a personal computer being necessitated. Another problem is that the personal computer must be started up in order to print the images stored on the digital camera.

In focusing on these points, the inventors of the present invention have thus far made a plurality of attempts to connect digital cameras directly to printers, and have the digital cameras issue print commands via their standard built-in display devices ("photo-direct printing").

Potential advantages of using the aforementioned photo-direct printing system include not only the obvious ability to print with ease, without having to have a personal computer up and running, but also the ability to build these systems inexpensively, owing to the fact that a personal computer would not be necessary to do so.

Additionally, using the display devices built into digital cameras as a means for verifying all of the instructions when a digital camera is connected to a printer, especially images to be printed, has the inescapable advantages of obviating any particular necessity for built-in display devices for doing such image verification on the part of the printer, and, moreover, achieving further cost reductions. The aforementioned photo-direct printing system is described in Japanese Patent Laid-Open No. 2004-009390.

DISCLOSURE OF THE INVENTION

Problems that the Invention is to Solve

While photo-direct printing systems, in and of themselves, are capable of being implemented, in the course of striving for greater user-friendliness, by using the display devices built in to digital cameras, and without having to operate a printer, the actual operation still requires working with the printer extensively, simply to turn the printer's power supply on or off, as follows, from A through H: A) Switch on the digital camera's power supply; B) Switch on the printer's power supply; C) Connect the digital camera to the printer; D) Activate photo-direct printer; E) End photo-direct printing; F) Disconnect the digital camera from the printer; G) Switch off the printer's power supply; and H) Switch off the digital camera's power supply.

The present invention, addressing the aforementioned concerns, has as its objective facilitating using photo-direct printing without having to operate a printer.

Means of Solving the Problems

According to one aspect of the present invention, there is provided a print apparatus that records an image on a recording medium; communication means for communicating with a digital camera; digital camera recognition means for recognizing the digital camera; status display means for displaying the status of the print apparatus; and display change means for changing the display status in the event that the communication means communicates with the digital camera, and the digital camera recognition means recognizes the digital camera, when the status display means is in power off state.

According to another aspect of the present invention, there is provided a printer control method that records an image on a recording medium; a communication step of communicating with a digital camera; a digital camera recognition step of recognizing the digital camera; a status display step of displaying an operating status of the print apparatus on a status display means; and a display change step of changing the display status of the status display means, in the event that, when the status display means is in power off state, the communication step communicates with a digital camera and the digital camera recognition step recognizes the digital camera.

According to another aspect of the present invention, there is provided a computer program that causes a computer to executes a printer control method for printing images on a storage medium, the computer program causes the computer to execute; a communication step of communicating with a digital camera; a digital camera recognition step of recognizing the digital camera; a status display step of displaying the operating status of the print apparatus on a status display means; and a display change step of changing the display status on the status display means, in the event that, when the status display means is in power off state, the communication step communicates with a digital camera and the digital camera recognition step recognizes the digital camera.

The present invention also provides a medium for storing the computer program.

The present invention also provides a communication apparatus, comprising: communication means for communicating with an external device; recognition means for recognizing a predetermined device as an external device that communicates via the communication means; status display means for changing display status corresponding to power on/off status; determination means for determining to change the display status of the status display means, in the event that, when the display status means is displaying power off state, the recognition means recognizes the predetermined device; and transmission means for transmitting predetermined information to the predetermined device, in the event that the determination means determines to change the display status.

Furthermore, according to another aspect of the present invention, there is provided an image output apparatus capable of communicating with a communication apparatus that comprises: communication means for communicating with an external device; recognition means for recognizing a predetermined device as an external device to communicate with via the communication means; status display means for changing display status corresponding to power on/off status; determination means for determining to change the display status by the status display means in the event that the recognition means recognizes the predetermined device when the display status means is displaying power off state; and transmission means for transmitting predetermined information to the predetermined device, in the event that the determination means determines to change the display status, said image output apparatus comprising: output screen display means for displaying a screen for image output; receiving means for receiving the predetermined information; and changing means for changing display status of the output screen display means, corresponding to the receipt of the predetermined information by the receiving means.

EFFECTS OF THE INVENTION

The present invention allows streamlining of user operations involved when connecting a digital camera directly to a direct printer and conducting photo-direct print processing, thus providing for simplified, less costly photo-direct printing of reliable quality.

Further features of the present invention will become apparent from the following description of exemplary embodiments with reference to the attached drawings.

BRIEF DESCRIPTION OF DRAWINGS

The attached drawings included with, and thus, constituting a portion of, the patent specification, exemplify the embodiments, and serve to clarify the explanations to follow, as well as the principles of the invention.

BEST MODE FOR CARRYING OUT THE INVENTION

Embodiments of the present invention will now be described in detail in accordance with the accompanying drawings.

Basic Configurations:

This section will begin by describing the basic configurations according to the present embodiment. "Photo-direct Printing" is the term given to the protocol for printing images stored in media within digital still cameras (digital cameras), in an environment where printers are able to communicate directly with digital cameras.

Figure 1:
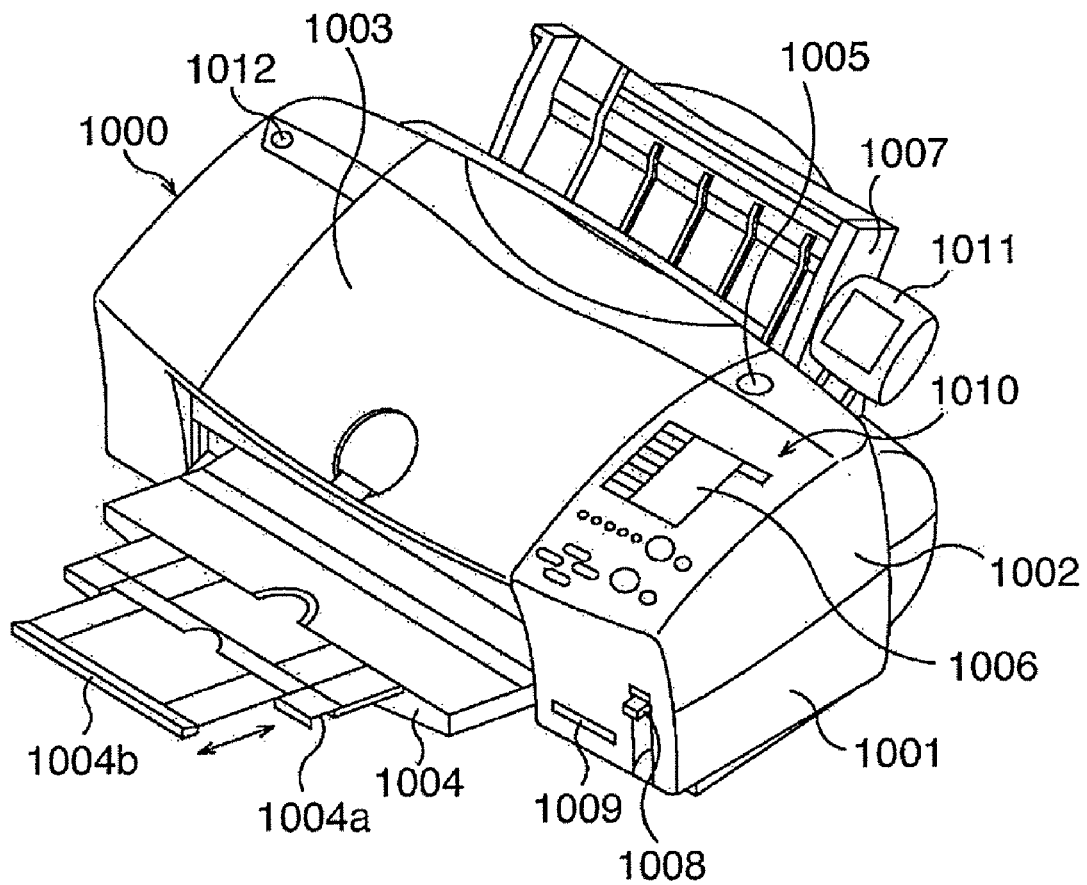
FIG. 1 depicts an oblique external view of a print apparatus according to the embodiments.
Figure 2:
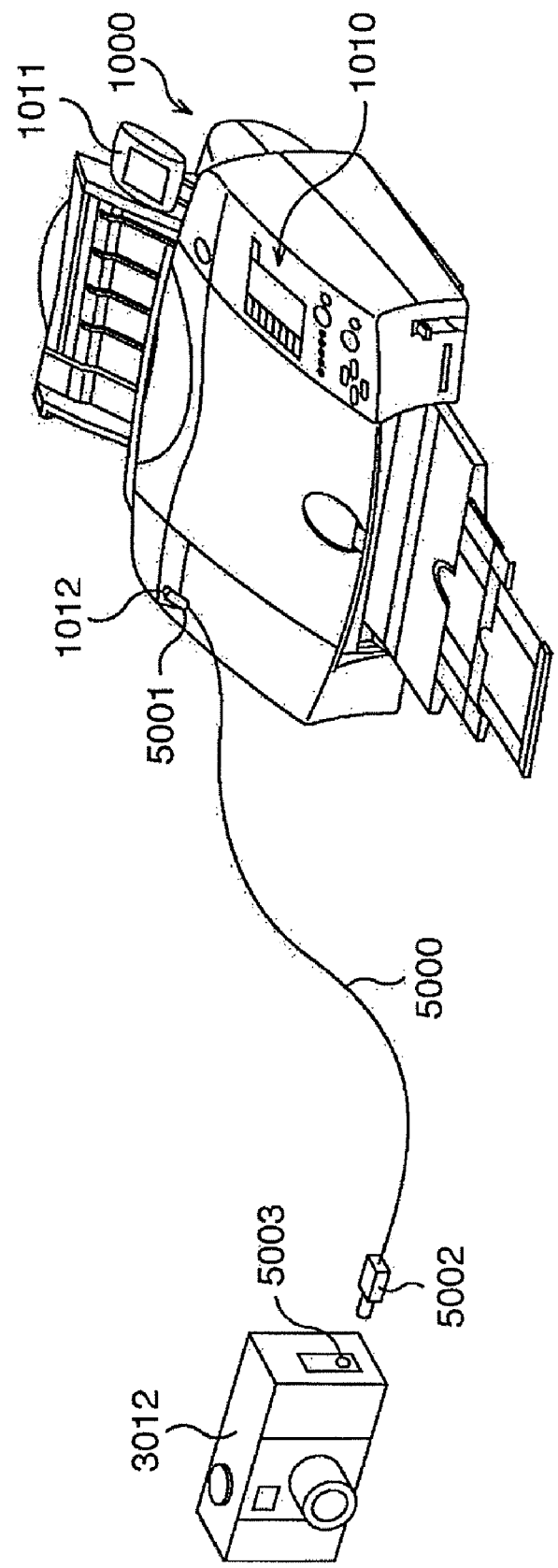
FIG. 2 depicts an example of connecting a digital camera to a print apparatus according to the embodiments.

FIG. 1 depicts an oblique external view of a Photo-direct (PD) printer according to the embodiment, and FIG. 2 depicts a direct connection between a digital camera and a printer.

In FIG. 1, PD print apparatus 1000 is equipped with the functions of a typical personal computer printer, receiving and printing data from a host computer (personal computer), as well as the functions of directly downloading and printing image data stored on storage media such as memory cards, or else receiving image data from a digital camera and printing the data.

The body of PD print apparatus 1000, with external casing removed, possesses a lower casing 1001, an upper casing 1002, an access cover 1003, and an external housing of a paper output tray 1004. Lower casing 1001 constitutes an abridgement of the lower part of the PD print apparatus, and upper casing 1002 constitutes an abridgement of the upper part of the PD print apparatus, and combining the casings forms a hollow structure with a storage space that stores the respective internal mechanisms that are described hereinafter, and ports are constituted in both upper and frontal portions of the structure.

Furthermore, a portion of paper output tray 1004 has capability of rotation maintained by lower casing 1001, and these rotations allow the port in the frontal portion of lower casing 1001 to be opened and closed. Consequently, when executing printing operations, opening the port by rotating paper output tray 1004 forward allows outputting of recording sheets and facilitates stacking of recording sheets as they are output.

Two auxiliary trays 1004a and 1004b are housed within paper output tray 1004, facilitating three stages of enlarging and reducing of supported printer paper sizes by extruding these trays as required.

An edge portion of access cover 1003 maintains freedom of rotation in upper casing 1002, allowing the port formed in the surface to open and close. Opening access cover 1003 facilitates replacing such components as recording head cartridges (not shown), or ink tanks (not shown), housed in the interior of the main body of the print apparatus.

Not diagrammed in detail is the fact that opening and closing access cover 1003 causes the protrusions formed on the underside to rotate the cover's open/close lever, and using a micro-switch or other contrivance to detect the lever's rotational position allows detection of the access lever's open or closed state.

A power key 1005, capable of being pressed down, is built on the surface of upper casing 1002. An operating status display unit 1006 is emplaced on upper surface 1010 of upper casing 1002. Runtime status display unit 1006 possesses LEDs or other light emitting elements, allowing users to verify visually whether PD print apparatus 1000 is, or is not, operational at a given time. Numeral 1007 dentes an automatic feeding unit, which automatically feeds printer paper into the main body of the apparatus. Numeral 1008 denotes a paper interval selection lever, for adjusting the interval between the print head and the recording medium. Numeral 1012 denotes a terminal for connecting a digital camera, as will be described hereinafter.

Conventionally, Universal Serial Bus (USB) is frequently used to connect digital cameras to personal computers, and thus, a USB interface has been adopted for terminal 1012 according to the embodiment, although other communications units may also be used instead. It has been made possible to connect the print apparatus to a digital camera from the front of the print apparatus, as per the diagram, in order to simplify the connection process.

PD print apparatus 1000 is equipped with an interface for facilitating printing from personal computers as well. Conventionally, once a connection to a personal computer is established, the connection is maintained, barring some extraordinary circumstance. Accordingly, the personal computer connection interface is located on the rear of the print apparatus. The personal computer connection interface supports two-way communication functionality, such as a Centronics Inc. parallel interface or a USB interface. Numeral 1009 denotes a card slot, which is used for directly reading and printing image data stored on memory cards or other storage media.

FIG. 2 depicts a connection between PD print apparatus 1000 and a digital camera 3012.

In FIG. 2, a cable 5000, for example, a USB cable comprises a connector 5001 for connecting to PD print apparatus 1000's connector 1012, and a connector 5002 for connecting to digital camera 3012's connector 5003. When connecting digital camera 3012 to a personal computer, connecting the connector 5001 to the personal computer's USB connector allows transferring the images taken with the digital camera to the personal computer.

Digital camera 3012 is constituted so as to allow outputting image data stored in its internal memory via connector 5003. A variety of assemblies may be applied to the constituency of digital camera 3012, comprising elements that may include, but are not limited to, memory as an internal storage unit, or a slot for loading removable memory. Using cable 5000 to connect PD print apparatus 1000 to digital camera 3012, as depicted in FIG. 2, allows printing of image data on PD print apparatus 1000, from digital camera 3012.

Figure 3:
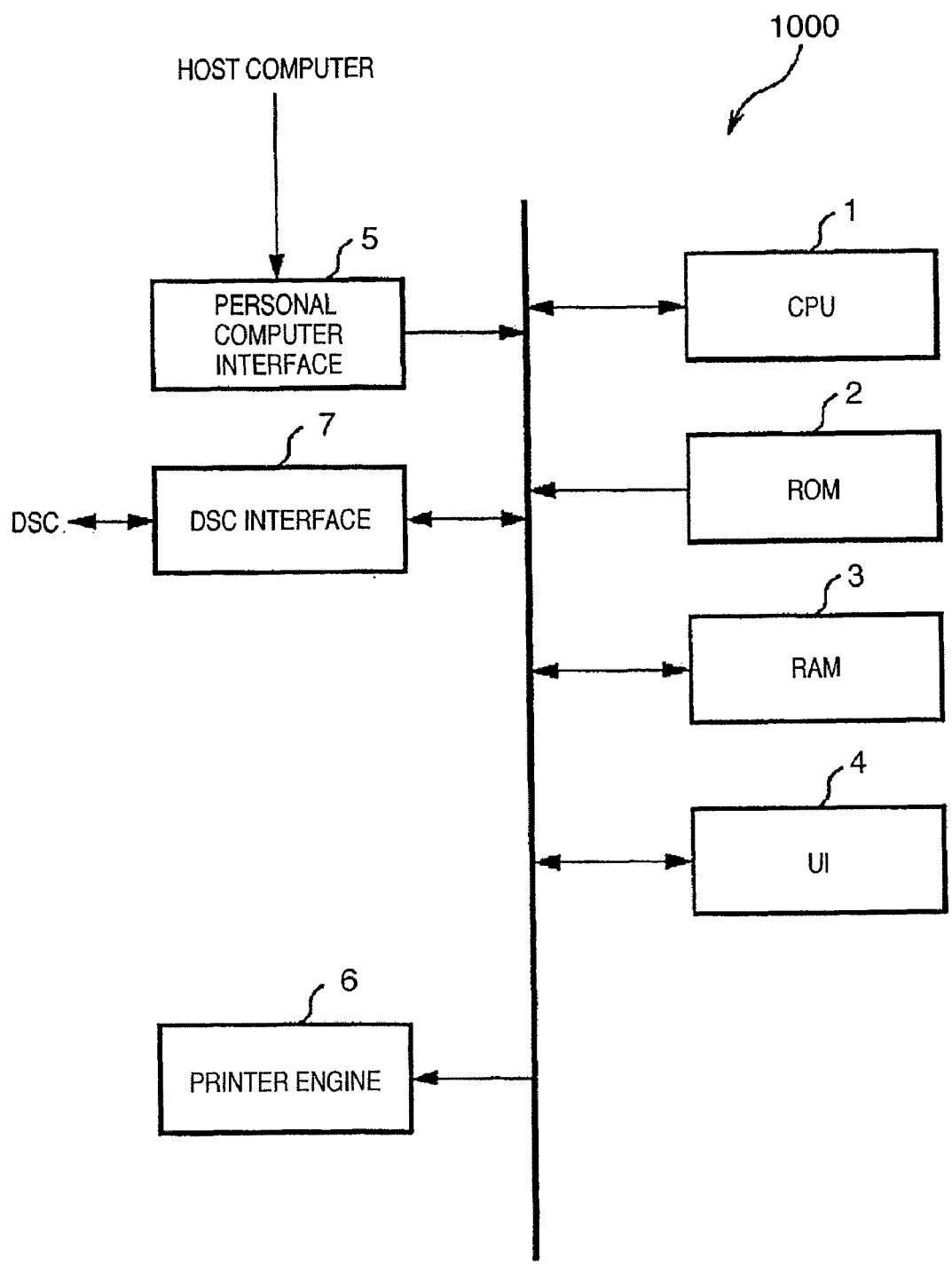
FIG. 3 is a block diagram that depicts an example of a print apparatus according to the embodiments.

FIG. 3 is a block diagram depicting an example of a PD print apparatus 1000 control system according to the embodiment.

In FIG. 3, numeral 1 denotes a CPU that controls the overall apparatus, numeral 2 denotes the ROM that stores the programs, or operation processing sequences, and fonts used by CPU 1, and numeral 3 denotes the RAM that serves as CPU 1's work area. Numeral 4, corresponding to FIG. 1, 1005 and 1006, denotes the user interface (UI), wherein the user directly operates the printer and checks its operating status.

Numeral 5 denotes the interface for connecting the printer to a personal computer, and numeral 7 denotes the USB host interface for connecting the printer to a digital still camera. Numeral 6 denotes the printer engine. Although the printer engine according to the embodiment uses thermal energy to shoot jets of ink, the recording format is not restricted to this protocol.

Figure 4:
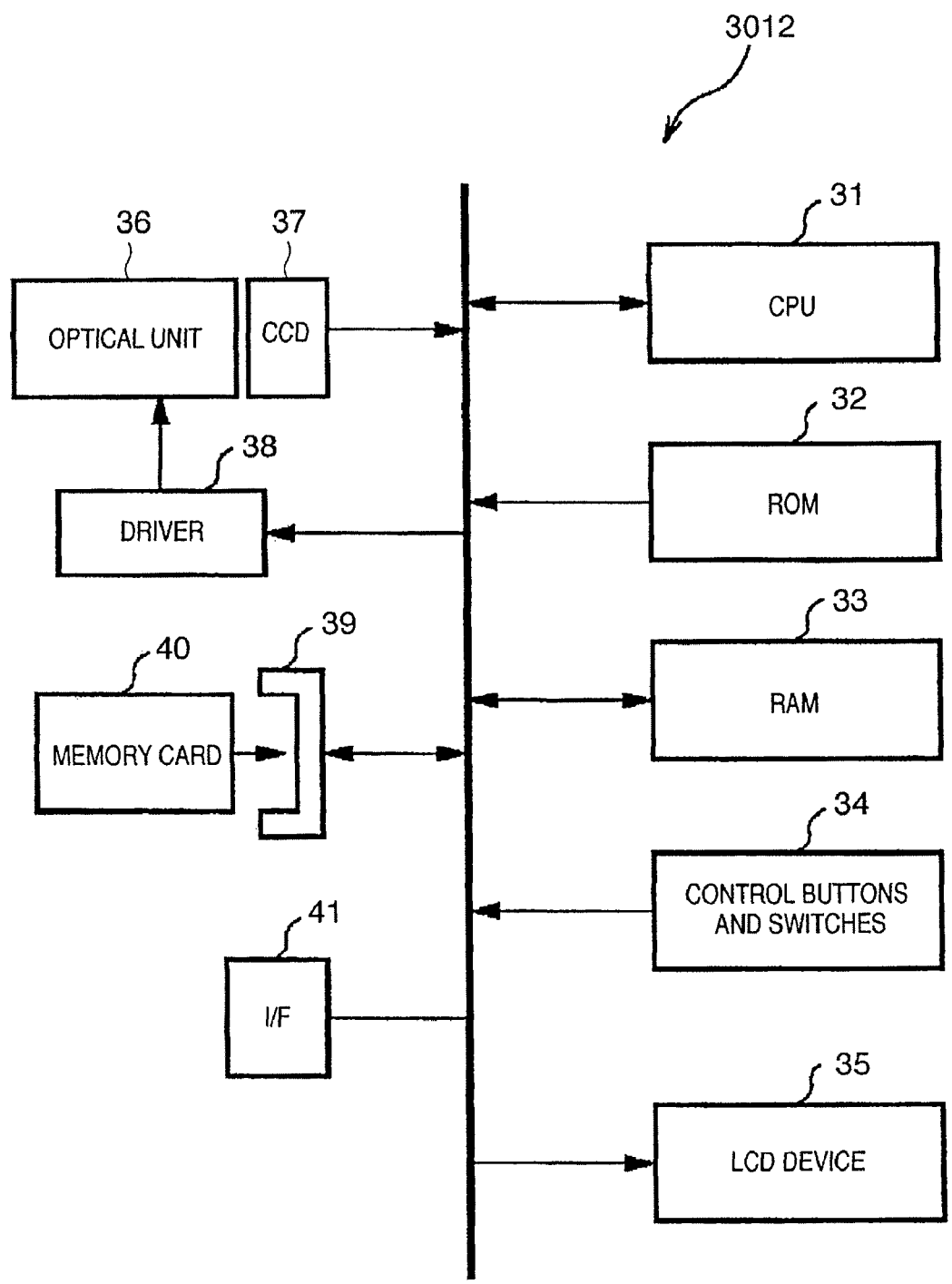
FIG. 4 is a block diagram that depicts an example of a digital camera according to the embodiments.

FIG. 4 is a block diagram depicting an example of digital camera, i.e., digital still camera, 3012. In FIG. 4, numeral 31 denotes a CPU that controls the digital camera as a whole, and numeral 32 denotes the ROM that stores the processing sequences used by CPU 31. Numeral 33 denotes the RAM that serves as CPU 33's work area, and numeral 34 denotes the suite of switches that operate the various functions. Numeral 35 denotes a liquid crystal display (LCD) unit for checking images being photographed, as well as displaying menus for the configuring of settings.

Numeral 36 denotes the optical unit, primarily comprising the lens and its drive assembly. Numeral 37 denotes the CCD element, and numeral 38 denotes the driver that controls the optical unit 36, under the control of CPU 31. Numeral 39 denotes the connector for connecting the storage medium 40, which may be a Compact Flash card, a memory card, a smart media card, or some other format, and numeral 41 denotes a USB slave interface for connecting either to a personal computer or PD print apparatus 1000 of the present embodiment.

The preceding is a description of examples of PD printer and digital camera assemblies according to the embodiment. Following is a description of the embodiment, based on these descriptions.

First Embodiment

Figure 5:
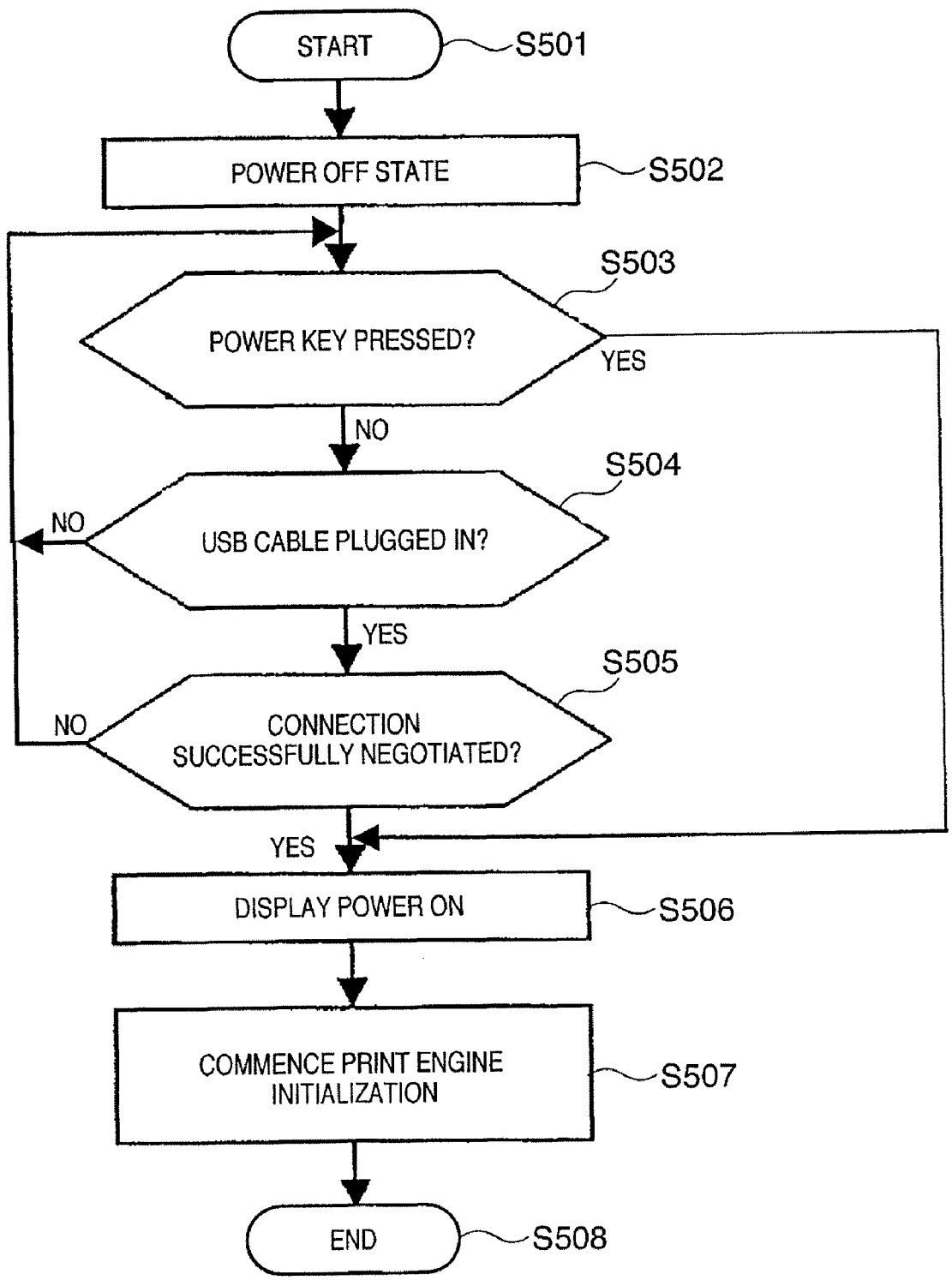
FIG. 5 is a flowchart that depicts a process sequence on a print apparatus according to the first embodiment.

FIG. 5 is a process sequence flowchart for PD printer 1000, when digital camera 3012 is connected by USB cable to PD printer 1000, according to the first embodiment.

Processing commences with Step S501, wherein PD printer 1000 is in a powered off state, as seen from the user's perspective. Typically, there are two main classes of powered off states. The first of these is a hardware powered off state, wherein the power supply is shut off and the CPU is out of operation, and hence, the PD printer 1000 cannot respond to external operations, aside from starting the power supply, or in other words, operations other than pressing the power key, for example.

The other is software powered off state, wherein the power supply is maintained, however slightly, the CPU also sustains operations, and software is being executed. Hence, the printer will respond to external operations, for instance, pressing the power key, allowing the power on operation to be carried out. The unit can be thought of as being in a power conservation state, distinct from regular current flow. Both power off states are identical from the user's perspective, in that, in both cases, the unit appears to be off. For the purposes of the present specification, power off refers to the software power off state. The initial power off display status in Step S502, that is, the operating status display unit 1006, depicts a power off state, from the user's perspective. Typically, this state might be signified by an LED being turned off.

In Step S503, the program checks whether the power key has been pressed or not. Based on the results of this check, it proceeds to Step S506, described hereinafter, if the power key has been pressed, or to Step S504 if the power key has not been pressed. In Step S504, the program checks whether a USB cable has been plugged in to the unit or not. Based on the results of this check, if a USB cable has not been plugged in, the program returns to Step S503 and continues processing. If a USB cable has been plugged in, processing proceeds to Step S505.

In Step S505, the program checks whether a connection has been successfully negotiated between the printer and digital camera 3012, connected by the USB cable, in accordance with prescribed communications protocols. While the details are elided, the program checks whether the device connected by the USB cable is a digital camera or not, as well as whether or not it possesses photo-direct print functionality.

Based on the results of the check in Step S505, the program returns to Step S503, and processing continues, in the event that negotiation fails. If it succeeds, on the other hand, processing proceeds to Step S506.

In Step S506, the CPU changes to a power on display status, and operating status display unit 1006 appears to depict a power on state from the user's perspective. Typically, this state is indicated by an LED lighting up. However, in combination with the print engine initialization processing in Step S507, following, the LED may be made to blink until the power on initialization is completed. Whichever approach is used, the important thing is that the user be able to comprehend that the PD printer 1000 status has clearly changed, compared with its power off status. The LED may be used, though no particular restrictions are placed on notification methods, with other possibilities including, but not limited to, buzzers, or mechanical sounds resulting from the printer carriage scanning.

Print engine initialization commences in Step S507, with prescribed information transmitted to external devices in accordance with the completion of the initialization. This allows these external devices to recognize that the printer is ready to print. Processing now proceeds to Step S508. Step S508 and later are the same as for the standard PD printer 1000, and are accordingly elided.

The reason why power is not unconditionally switched on in the event that a USB cable is determined to be plugged in Step S504, and a check is made instead in Step S505, is out of a desire to avoid PD printer 1000 print engine initialization in the event that a mouse, a speaker, or some other non-photo-direct print compliant device is connected via USB cable to PD printer 1000.

This is because, in some circumstances, when the print engine is initialized, it may engage in automatic suction of ink, or preliminary ink ejection, among other possible acts, in order to maintain print quality in response to such conditions as the time elapsed since the last print job, and it is desirable to avoid wasting ink in response to non-photo-direct print compliant devices being connected to the printer. Print preparation steps before printing, such as cleaning of print heads, ink suction, preliminary ink ejection, transitioning to a preheated status, error checking, or checking of ink levels, will also be elided as appropriate.

Pursuant to the foregoing, given the PD printer 1000 power off status, negotiating with external devices connected by USB cables and transitioning to power on status by successfully negotiating a connection allows easy photo-direct printing by requiring one less operating step on the part of the user when carrying out photo-direct printing.

Figure 9:
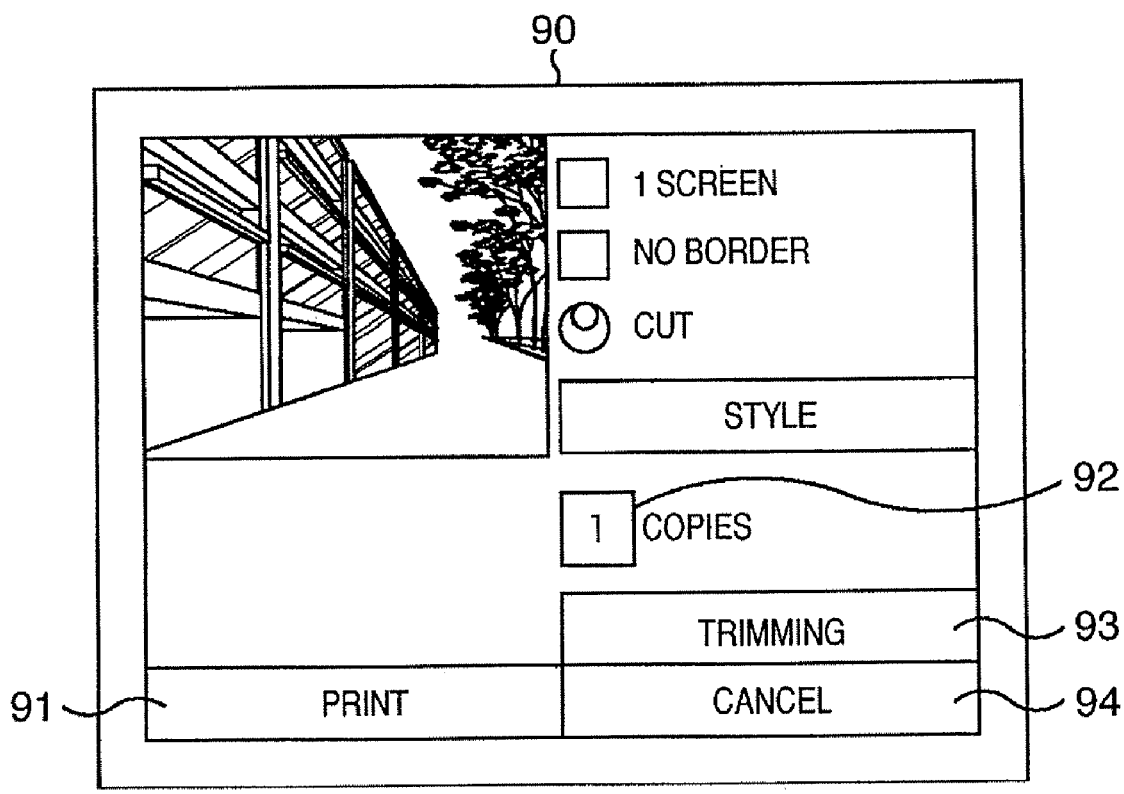
FIG. 9 depicts an example of a digital camera status display.

An example of the display status of a digital camera connected as per FIG. 5 is depicted in FIG. 9.

Print setting screen 90 is displayed when the digital camera is connected by USB cable to the printer and the prescribed communication commences. According to the embodiment, the screen is displayed when a successful negotiation takes place in FIG. 5, Step S505, allowing configuration of various print settings, including but not limited to image selection or trimming.

Print execute button 91, at the lower left of print setting screen 90, is the button that gives the print execution command. At the Step S505 stage, print execute button 91 is grayed out, or otherwise not displayed, preventing the print execution instruction from being performed. Numeral 92 denotes the button for setting the number of copies to be printed, numeral 93 denotes the trimming button, and numeral 94 denotes the cancel button.

When a digital camera recognizes that the printer has completed its initialization in Step S507, the display of print execute button 91 is changed to show that it is clearly displayed, allowing users to conduct print operations.

In addition to being able to recognize that preparations for printing are complete, these steps also allow a user to instruct printing only upon completion of preparations for printing. This allows avoiding the circumstance of keeping users waiting excessively for printer preparation after the user's instruction of print execution.

According to the embodiment, at the stage where it is determined that the power status has changed to a power on state, the display of power state is changed (S506), after which, printer preparation operations (S507) take place. It is also permissible to change the power on status display in response to completing the printer preparations, i.e., initialization operations, following the establishment of communications in Step S505. Once the power on status display change determination has been made, information is transferred to the digital camera.

Based on this information, the digital camera may be made to change the content of its display, including but not limited to transitioning to print setting screen 90 or activating print execute button 91 in print setting screen 90. Facilitating such constructions allows, for example, to recognize that the printer is in a print readiness state at the same time as the printer's power display is in the on state.

Second Embodiment

Figure 6:
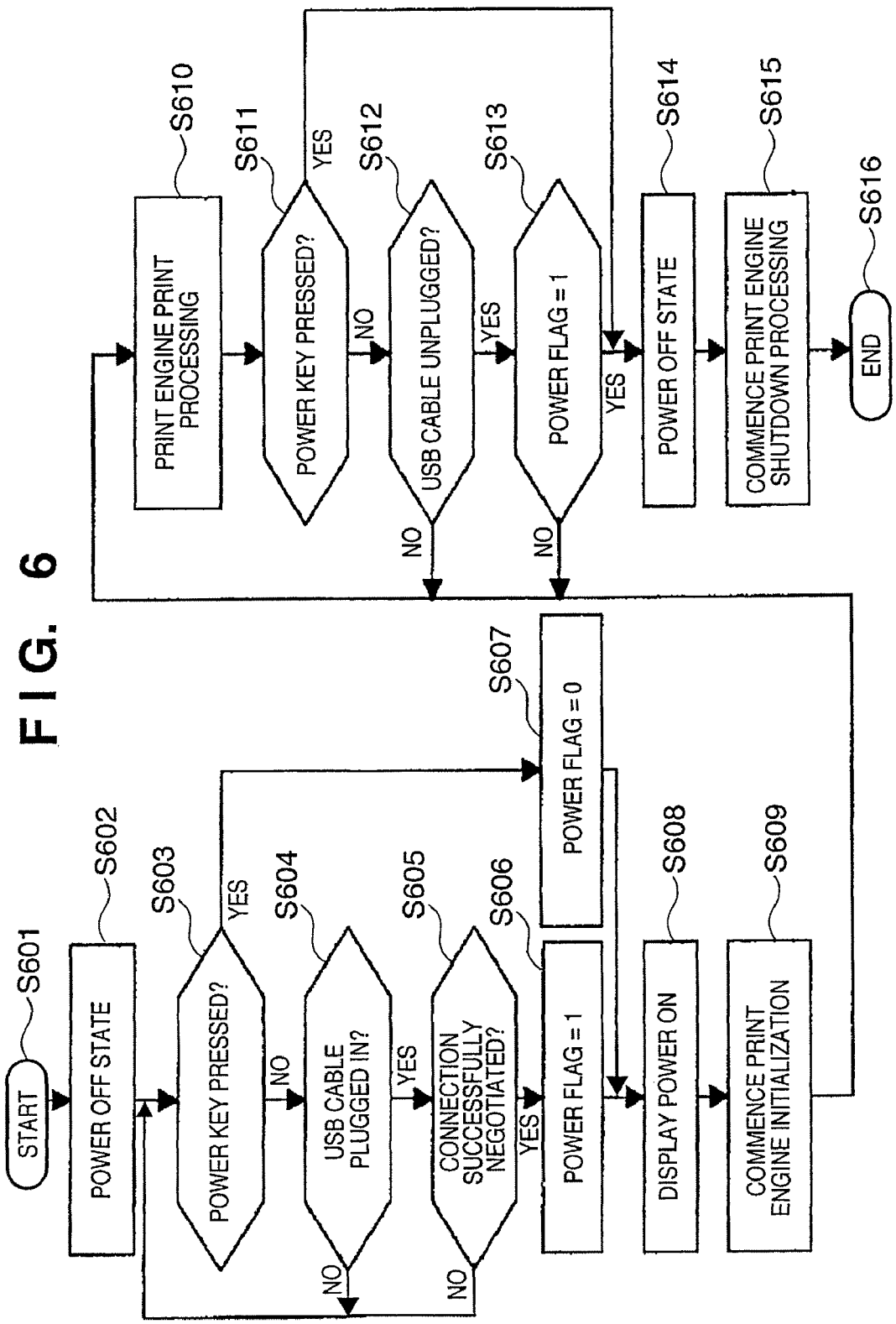
FIG. 6 is a flowchart that depicts a process sequence on a print apparatus according to the second embodiment.

FIG. 6 is a process sequence flowchart for PD printer 1000, when digital camera 3012 is connected by USB cable to PD printer 1000, according to the second embodiment.

Processing commences with Step S601, wherein PD printer 1000 is in a power off state from the user's viewpoint. The first step, Step S602, shows the process in a power off state. In Step S603, the process checks whether the power key has been pressed or not. If the power key is pressed, the process proceeds to Step S607, and in Step S607, the power flag is set to "0," after which, the process proceeds to Step S608, following.

If, as a result of the check in Step S603, the power key has not been pressed, the process proceeds to Step S604. In Step S604, the process checks whether a USB cable has been plugged in or not. If, as a result of this check, a USB cable has not been plugged in, the process returns to Step S603. On the other hand, if a USB cable has been plugged in, the process proceeds to Step S605.

In Step S605, the process checks whether a connection has been successfully negotiated between the printer and the digital camera 3012 connected to the printer via the USB cable, or not. If negotiation fails, the process returns to Step S603 and continues processing.

If, on the other hand, negotiation is successful, the process proceeds to Step S606, and in Step S607, the power flag is set to "1," whereupon the process proceeds to Step S608. In Step S608, the power display status changes to on. In Step S609, print engine initialization commences, and the process proceeds to Step S610 upon completion of the initialization. In Step S610, the print engine performs print processing. While the details are elided, the print engine performs as appropriate, pursuant to the photo-direct print functionality.

In Step S611, the process checks whether the power key has been pressed or not. If, as a result of this check, the power key has been pressed, the process proceeds to Step S614, following. If, on the other hand, the power key has not been pressed, as a result of the check in Step S611, the process proceeds to Step S612. In Step S612, the process checks whether the USB cable has been unplugged or not.

If, as a result of this check, the USB cable has not been unplugged, the process returns to Step S610 and continues. If, on the other hand, the USB cable has been unplugged, the process proceeds to Step S613. In Step S613, the process checks whether the power flag is set to "1" or not.

If, as a result of this check, the power flag is not "1," it means that the power was on according to Steps S603, S607, and S608, or in other words, that the printer was powered on by pressing the power key, in which case, the process returns to Step S610 and continues.

If, on the other hand, the power flag is "1," it means that the power was on, according to Steps S604, S605, S606, and S608, or in other words, that the printer was powered on by plugging in a USB cable, and the process proceeds to Step S614.

In Step S614, a power off state is depicted, that is, operating status display unit 1006 depicts a power off state from the user's viewpoint. While this is typically a state wherein an LED is off, other situations are conceivable, including, but not limited to an LED blinking, in combination with print engine shutdown processing in the following Step S615, until the processing is completed.

Whichever approach is used, the important thing is that the user be able to comprehend that the PD printer 1000 status has clearly changed, compared with its power on status. The LED may be used, though no particular restrictions are placed on notification methods, with other possibilities including, but not limited to, buzzers, or mechanical sounds resulting from the printer carriage scanning. In Step S615, print engine shutdown processing commences, and the process proceeds to Step S616 when shutdown processing is completed. Step S618 and later are the same as for the standard PD printer 1000, and are accordingly elided. The process concludes with Step S616 according to the present embodiment.

The reason why power is not unconditionally switched off in the event that a USB cable has been unplugged in Step S612, and a check is made in Step S613, is because it is assumed that, given the fact that the printer is in a power on state as a result of the power key being pressed in Step S603, there would be possibility that a print job is issued from a personal computer, even after unplugging a USB cable.

Conversely, if the printer is in a power on state in Step S614 because the USB cable is plugged in, it is assumed that the possibility of a print job being run from a personal computer after the USB cable has been unplugged is relatively low, and thus, it is relatively safe to power the printer off.

As per the foregoing, if PD printer 1000 successfully negotiates, while in power off state, with an external device connected via a USB cable, and transitions to power on state as a result, then PD printer 1000 transitions to power off state when a USB cable is unplugged. This allows safely skipping two user operations involved with photo-direct print processing, allowing more streamlined photo-direct printing.

Third Embodiment

Figure 7:
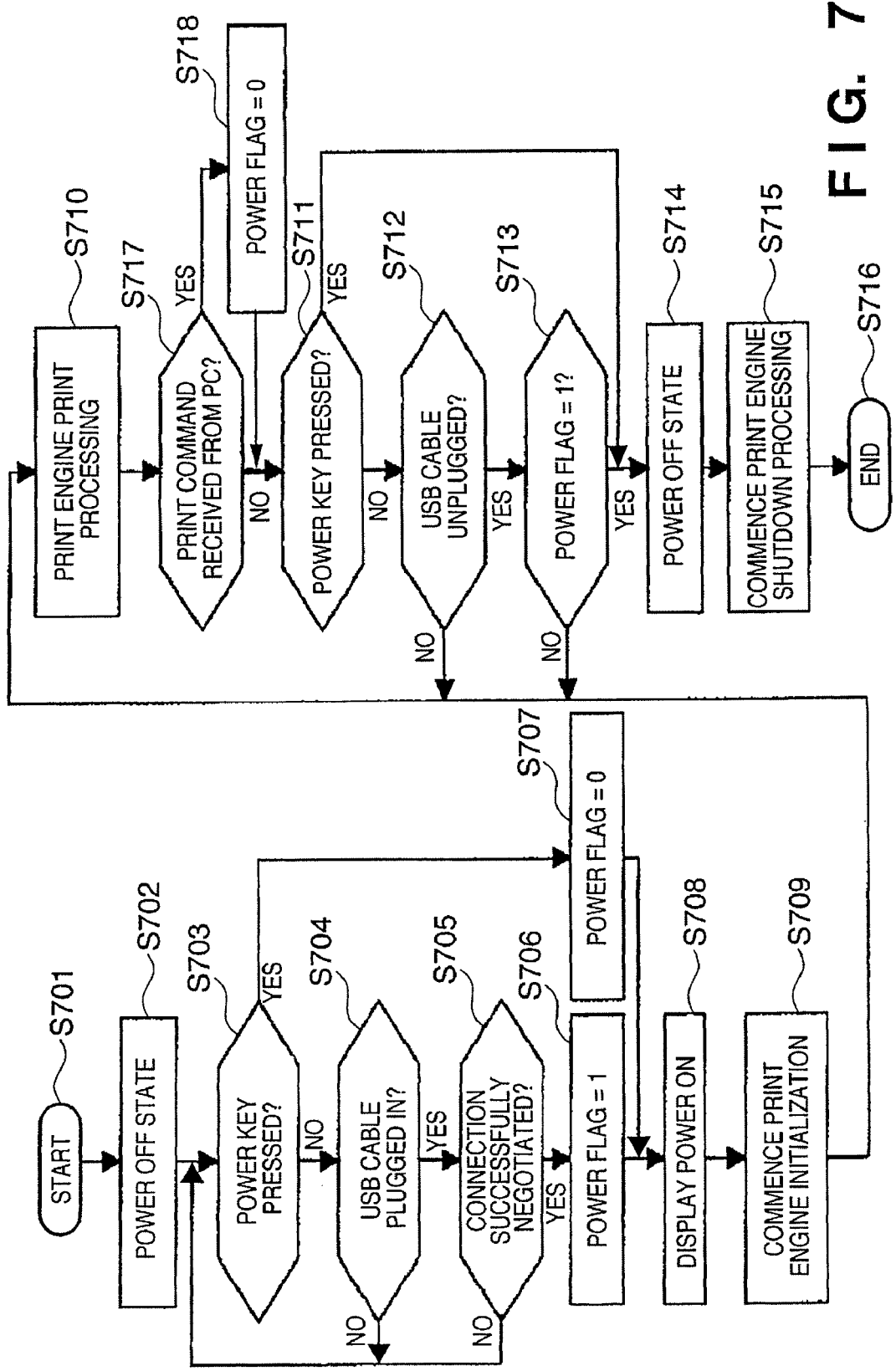
FIG. 7 is a flowchart that depicts a process sequence on a print apparatus according to the third embodiment.

FIG. 7 is a process sequence flowchart for PD printer 1000, when digital camera 3012 is connected by USB cable to PD printer 1000, according to the third embodiment.

Steps S701-S716 correspond to Steps S601-S616 in FIG. 6, and the respective processes proceed identically, with the exception of proceeding from Step S710 to Step S717, rather than directly to Step S711.

Accordingly, this section will explain the workings of Step S717 and Step S718 in detail, according to the present embodiment.

PD printer 1000, which commences processing with Step S701, proceeds to Step S717, following print processing of print engine in S710. In Step S717, it checks whether a print command has come from a personal computer. If, as a result of this check, a print command has come, the process proceeds to Step S718, where the power flag is set to "0," and the process then proceeds to Step S711, following.

If, on the other hand, no print command has come, as a result of the check in Step S717, the process proceeds to Step S711, and the PD printer 1000 process ends if it proceeds from Step S711 to Step S716.

The reason why the power flag is set to "0" in Step S718 is because it is assumed that, given the fact that a print command has come from a personal computer in Step S717, there would be possibility that a print job is issued from a personal computer, even after unplugging a USB cable. If the power flag is set to "0," the process would return to Step S710 and continue, as a consequence of the determination in Step S713, even if the USB cable is eventually unplugged, thus allowing prevention of transitioning to a power off status when the USB cable is unplugged.

The real object of checking whether or not a print command has come from a personal computer in Step S717 is to determine whether or not there is a strong probability that a print job will be issued from a personal computer after the USB cable is unplugged. Accordingly, it is permissible to check, as a pragmatic verification method, by actually receiving a print job, as described in Step S717, by device enumeration by the USB host, or by other methods.

As per the foregoing, it is assumed that, if a print command has come from a personal computer when PD printer 1000 is in power off state, it is equivalent to transitioning to power on state by pressing the power button, regardless of the actual method used to transition to power on state, thus allowing safely skipping two user operations involved with photo-direct print processing, allowing more streamlined photo-direct printing, while also minimizing corruption when printing from a personal computer.

Fourth Embodiment

Figure 8:
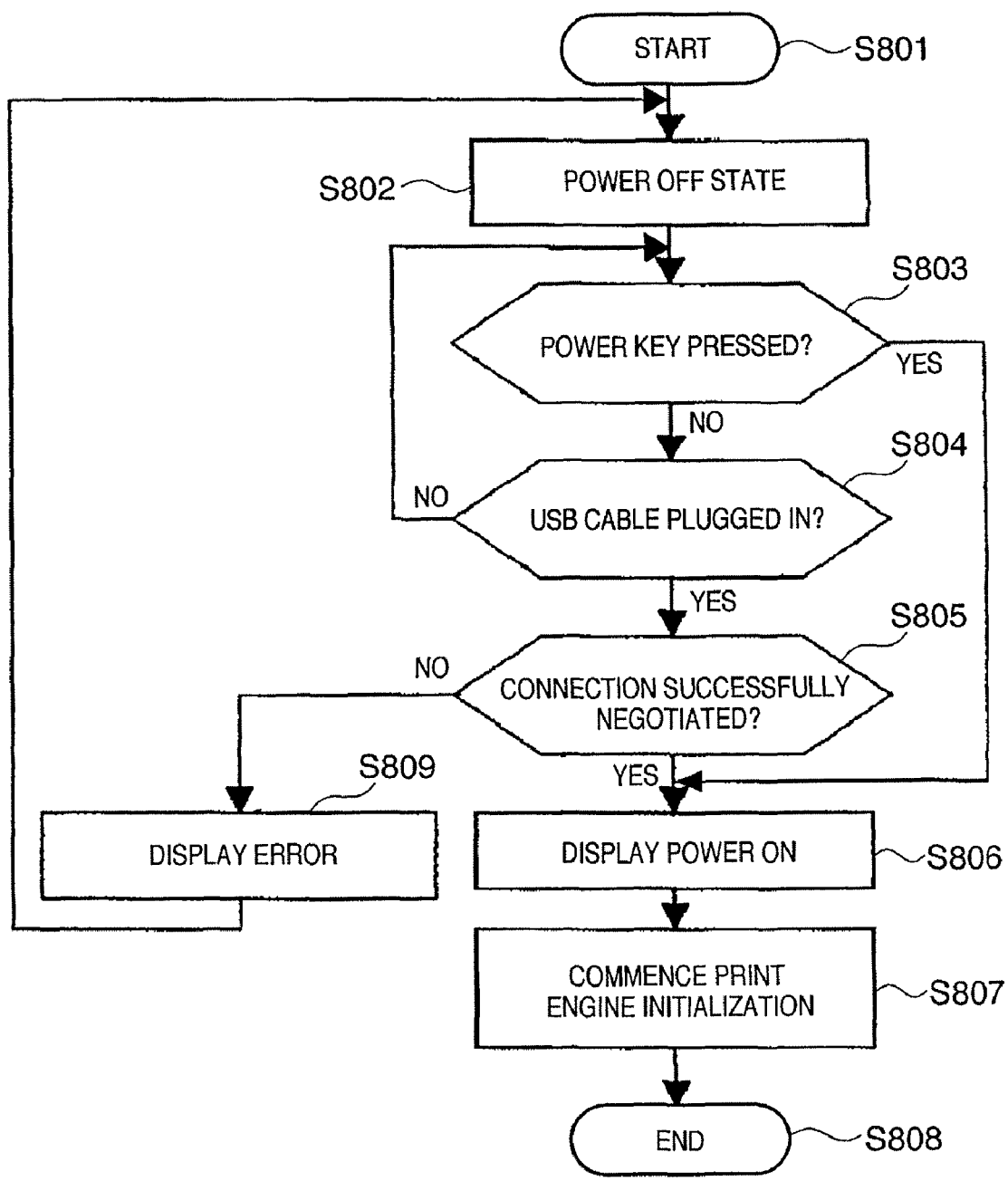
FIG. 8 is a flowchart that depicts a process sequence on a print apparatus according to the fourth embodiment.

FIG. 8 is a process sequence flowchart for PD printer 1000, when digital camera 3012 is connected by USB cable to PD printer 1000, according to the fourth embodiment.

Steps S801-S808 correspond to Steps S501-S508 in FIG. 5, and the respective processes proceed identically, with the exception that the process proceeds from Step S805 to Step S809, rather than directly to Step S802, in the event that the determination in Step S805 is "No."

Accordingly, this section will explain the workings of Step S809, according to the present embodiment.

PD printer 1000, which commences processing with Step S801, proceeds to Step S809, in the event that negotiation in Step S805 fails. In Step S809, an error display status occurs, that is, from the user's perspective, operating status display unit 1006 displays an error.

Typically, this state might be signified by a blinking LED of a different color than the LED that signifies power on or off. This is to communicate the state to the user in the event that, for example, a device connected by a USB cable is a mouse, a speaker, or some other non-photo-direct print compliant device. The process proceeds to Step S802, wherein the printer return to power off state and the process continues. The PD printer 1000 process ends if it proceeds from Step S802 to Step S808.

The reason for displaying an error in Step S809 is to communicate to the user that direct photo print cannot be carried out. Accordingly, the important thing is that the user be able to comprehend that the PD printer 1000 status has clearly changed, compared with its power on or off status, and the LED of a different color may be used, or the same LED as the power on or off status LED may be used with a different blink pattern.

No particular restrictions are placed on notification methods, with other possibilities including, but not limited to, buzzers, or mechanical sounds resulting from the printer carriage scanning. The process may proceed immediately to Step S802 following the error display, or the error display may persist until the USB cable is unplugged; No particular restrictions are placed on implementation methods.

As per the foregoing, by having PD printer 1000 negotiates with an external device connected by a USB cable when in power off state, and transitions to power on state when the negotiation succeeds, or displays an error in the event that the negotiation fails. This allows skipping a user operation involved with photo-direct print processing, and allows more streamlined and exact photo-direct printing.

Power on state as referred to herein can be thought of as taking a display format different from that of the state where power is off. In other words, if power is off, then normally, all display units are unlit. According to the present embodiment, a unit controlling internal communications will be in communications state. In a state where a digital camera or other image output device is not connected, or communication with an image output device is not established, however, all display units are, again, unlit, as with power being off.

When a digital camera or other image output device is connected, the display state is similar to regular power status, in response to commencement of communication between the image output device and the printer. It is true that it is not necessary for the display state to be similar to regular power status, and it is entirely possible to recognize that communication has been established even in the face of a different display state from that when power is not being delivered. Furthermore, any necessity of operation for supplying power is thus obviated.

It is also true that any combinations of the foregoing first to fourth embodiments are permissible. Whereas it has been described in the second and third embodiments that print commands are sent from a personal computer to PD printer 1000, aside from photo-direct print, this description signifies commands issued other than via photo-direct print, and by no means restricts such commands to coming solely from personal computers.

Whereas USB interfaces and USB cables have been further cited according to the embodiment as units for connecting digital cameras with PD printers, it is permissible to use other connection units; these are not restricted to USB interfaces or USB cables. Wireless connectivity, such as Bluetooth or wireless LAN technology, is also acceptable, for example. As a plurality of digital cameras are equipped with USB interfaces, it would be desirable to use USB connectivity with regard to considerations of being able to leverage such pre-existing hardware resources, which also reduces demands on digital camera manufacturers.

It has also been described according to the embodiment that the printer apparatus is a USB host, and the digital camera, a USB slave. As per the foregoing, given the facts that a plurality of modern digital cameras are fitted with USB slave functionality for the purpose of communicating with personal computers, that there are more manufacturers of digital cameras than there are manufacturers of printers, and furthermore, that host apparatus have low levels of concern about power, making the printer fulfill the role of host is preferable to the various manufacturers and end users alike, because it reduces demands on the manufacturers, and provides them significant advantage when they build systems that have the present invention as their objective.

Other Embodiments According to the Present Invention

Also included within the category of the present invention are units that supply program code, either to computers that are built into apparatus or systems connected to the foregoing devices, for software required to achieve functionality according to the embodiments, and operate the devices in accordance with the programs loaded into computer CPUs or MPUs associated with the systems or apparatus, similar to operating the various devices necessary to achieve the functionality of the foregoing embodiments.

In such instances, the software program code itself achieves functionality according to the embodiments, and the program code itself, as well as the unit that supplies the program code to the computer, such as a storage medium in which the program code is loaded, constitutes the present invention. Examples of storage media that can be used to store program code include, but are not limited to, flexible disks, hard disks, optical discs, magneto-optical disks, CD-ROMs, magnetic tape, non-volatile memory cards, and ROM.

Executing program code supplied to the computer achieves functionality according to the embodiments, in addition to the program code being included in the embodiments according to the present invention in the event that the program code works in conjunction with the operating system, other software applications, or other code running on the computer together with the program code.

Furthermore, once the supplied program code is loaded in memory, which is provided either in a computer expansion board or an expansion unit connected to a computer, the CPU or other unit provided in the computer expansion board or expansion unit performs part or all of the actual processes, in accordance with the commands in the program code, and the functionality according to the embodiments described by the processes, when achieved, is included within the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

CLAIM TO PRIORITY

This application claims the benefit of Japanese Patent Application No. 2004-170225, filed Jun. 8, 2004, which is hereby incorporated by reference herein in its entirety.

The invention claimed is:

1. A print apparatus that records an image on a recording medium, the apparatus comprising:
   a first communication unit adapted to connect to and communicate with an external device;
   a first recognition unit adapted to recognize connections and communications between the external device and the first communication unit;
   a status display unit adapted to display an operating status of the print apparatus;
   a display change unit adapted to, in response to a recognition of a connection between the external device and the first communication unit, by the first recognition unit, set the status display unit to a power on state, and set the status display unit to a power off state, if the first recognition unit recognizes that the connection between the external device and the first communication unit is disconnected and if the display change unit has set the status display unit to the power on state;
   a second communication unit adapted to communicate with a device other than the external device;
   a second recognition unit adapted to recognize a communication between the device other than the external device and the second communication unit;

a power key detection unit adapted to detect whether the print apparatus has been powered on through an operation of a power key; and a storing unit adapted to store information indicating that the print apparatus has been powered on through the operation of the power key, if the power key detection unit detects that the print apparatus has been powered on through the operation of the power key, wherein, if the second recognition unit recognizes the communication between the device other than the external device and the second communication unit, the display change unit does not set the status display unit to the power off state, if the first recognition unit recognizes that the connection between the external device and the first communication unit is disconnected, and wherein, if the storing unit stores the information indicating that the print apparatus has been powered on through the operation of the power key and if the first recognition unit recognizes that the connection between the external device and the first communication unit is disconnected, the display change unit does not set the status display unit to the power off state.

2. The print apparatus according to claim 1, wherein the status display unit sets a state of the status display unit, when a state of the external device changes to the power on state.

3. The print apparatus according to claim 1, wherein the first communication unit communicates using Universal Serial Bus (USB) communications.

4. The print apparatus according to claim 1, wherein the first communication unit communicates using at least one of: Bluetooth communications, wireless Local Area Network (LAN) communications, and wired LAN communications.

5. The print apparatus according to claim 1, further comprising a determining unit adapted to, in response to a recognition by the first recognition unit of the connection between the external device and the first communication unit, communicate with the external device and determine whether the external device corresponds to a predetermined print protocol, wherein, if the determination unit determines that the external device corresponds to the predetermined print protocol, the display change unit changes the status display unit to the power on state.

6. The print apparatus according to claim 5, wherein a first display is displayed using the status display unit, if the determining unit determines that the external device corresponds to the predetermined print protocol, and wherein a second display, which differs from the first display, is displayed using the status display unit, if the determining unit determines that the external device does not correspond to the predetermined print protocol.

7. The print apparatus according to claim 1, wherein the external device is a digital camera.

8. The print apparatus according to claim 5, further comprising a print preparation unit adapted to commence preparation for printing, if the determining unit determines that communication using the predetermined print protocol is possible.

9. The print apparatus according to claim 8, wherein the preparation performed by the print preparation unit includes any of: printer head cleaning, ink suction, preliminary discharge of ink, transitioning to a preheated status, error checking, and checking of ink levels.

10. A printer control method that records an image on a recording medium, the method comprising:

a first recognition step of recognizing connections and communications with an external device via a first communication unit adapted to communicate with an external device;

a status display step of displaying an operating status of a print apparatus on a status display unit;

a display change step of, in response to a recognition of a connection between the external device and the first communication unit in the first recognition step, setting the status display unit to a power on state, and setting the status display unit to a power off state, if the connection between the external device and the first communication unit recognized in the first recognition step is disconnected and if the status display unit is changed to a power on state in the display change step;

a second communication step of communicating with a device other than the external device using a second communication unit;

a second recognition step of recognizing a communication between the device other than the external device and a second communication unit;

a power key detection step of detecting whether the print apparatus has been powered on through an operation of a power key; and a storing step of storing information indicating that the print apparatus has been powered on through the operation of the power key, if the print apparatus is detected to have been powered on through the operation of the power key, wherein, if the communication between the device other than the external device and the second communication unit is recognized in the second recognition step, the status display unit is not set to the power off state in the display change step, if the connection between the external device and the first communication unit recognized in the first recognition step is disconnected, and wherein, if the information indicating that the print apparatus has been powered on through the operation of the power key has been stored and if the connection between the external device and the first communication unit is recognized in the first recognition step to be disconnected, the status display unit is not set to the power off state in the display change step.

11. A non-transitory computer-readable storage medium storing computer-executable program code that, when executed by a computer, causes the computer to perform a method for controlling a printer that prints an image on a printing medium, the method comprising:

a first recognition step of recognizing connections and communications with an external device via a first communication unit adapted to communicate with an external device;

a status display step of displaying an operating status of a print apparatus on a status display unit;

a display change step of, in response to a recognition of a connection between the external device and the first communication unit in the first recognition step, setting the status display unit to a power on state, and setting the status display unit to a power off state, if the connection between the external device and the first communication unit recognized in the first recognition step is disconnected and if the status display unit is changed to the power on state in the display change step;

a second communication step of communicating with a device other than the external device using a second communication unit;

a second recognition step of recognizing a communication between the device other than the external device and the second communication unit;

a power key detection step of detecting whether the print apparatus has been powered on through an operation of a power key; and a storing step of storing information indicating that the print apparatus has been powered on through the operation of the power key, if the print apparatus is detected to have been powered on through the operation of the power key in the power key detection step, wherein, if the communication between the device other than the external device and the second communication unit is recognized in the second recognition step, the status display unit is not set to the power off state in the display change step, if the communication between the external device and the first communication unit recognized in the first recognition step is disconnected, and wherein, if the information indicating that the print apparatus has been powered on through the operation of the power key has been stored in the storing step and if the connection between the external device and the first communication unit is recognized in the first recognition step to be disconnected, the status display unit is not set to the power off state in display change step.

12. The apparatus according to claim 1, wherein the second recognition unit recognizes the communication between the device other than the external device and the second communication unit by detecting that a print instruction is received from the device other than the external device, and wherein, if the second recognition unit recognizes that the print instruction is received, the display change unit does not set the status display unit to the power off state, if the first recognition unit recognizes that the connection between the external device and the first communication unit is disconnected.

13. The apparatus according to claim 1, further comprising:

a power key; and a memory unit adapted to store information indicating that the apparatus has been powered on through an operation of the power key, wherein, if the memory unit stores the information indicating that the apparatus has been powered on through the operation of the power key, the display change unit does not set the status display unit to the power off state, if the first recognition unit recognizes that the connection between the external device and the first communication unit is disconnected.

14. The method according to claim 10, wherein the communication between the device other than the external device and the second communication unit is recognized in the second recognition step by detecting that a print instruction is received from the device other than the external device, and wherein, in a case where the print instruction is detected in the second recognition step, the status display unit is not set to the power off state in the display change step, if the connection between the external device and the first communication unit recognized in the first recognition step is disconnected.

* * * * *